United States Patent
Seo et al.

(10) Patent No.: US 9,867,173 B2
(45) Date of Patent: Jan. 9, 2018

(54) METHOD AND APPARATUS FOR RECEIVING DOWNLINK SIGNAL IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 356 days.

(21) Appl. No.: 14/415,099

(22) PCT Filed: Jul. 26, 2013

(86) PCT No.: PCT/KR2013/006723
§ 371 (c)(1),
(2) Date: Jan. 15, 2015

(87) PCT Pub. No.: WO2014/017867
PCT Pub. Date: Jan. 30, 2014

(65) Prior Publication Data
US 2015/0189629 A1 Jul. 2, 2015

Related U.S. Application Data

(60) Provisional application No. 61/676,343, filed on Jul. 27, 2012.

(51) Int. Cl.
*H04W 72/04* (2009.01)
*H04L 5/00* (2006.01)

(52) U.S. Cl.
CPC ........... *H04W 72/042* (2013.01); *H04L 5/001* (2013.01); *H04L 5/0053* (2013.01); *H04L 5/0023* (2013.01); *H04L 5/0048* (2013.01)

(58) Field of Classification Search
CPC ..... H04L 5/001; H04L 5/0023; H04L 5/0048; H04L 5/0053; H04W 72/042
See application file for complete search history.

(56) References Cited

U.S. PATENT DOCUMENTS

2010/0279628 A1* 11/2010 Love .............. H04L 5/0091
455/70
2011/0222485 A1* 9/2011 Nangia ............ H04B 7/0452
370/329

(Continued)

FOREIGN PATENT DOCUMENTS

KR WO 2011008013 A2 * 1/2011 ............ H04B 7/155
WO 2012/053715 4/2012

OTHER PUBLICATIONS

Huawei, et al.,, "Fallback operation for ePDCCH," 3GPP TSG RAN WG1 Meeting #69, R1-121966, May 2012, 3 pages.

(Continued)

*Primary Examiner* — Dung B Huynh
(74) *Attorney, Agent, or Firm* — Lee, Hong, Degerman, Kang & Waimey

(57) ABSTRACT

One embodiment of the present invention relates to a method for enabling a terminal to receive a downlink signal through an enhanced physical downlink control channel (EPDCCH), comprising the steps of: decoding fallback downlink control information (DCI) format in an EPDCCH physical resource block set; and receiving a physical downlink shared channel (PDSCH) on the basis of the fallback DCI format, wherein the PDSCH transmission for receiving the PDSCH is determined according to whether the EPDCCH physical resource block set corresponds to localized EPDCCH transmission or distributed EPDCCH transmission.

8 Claims, 10 Drawing Sheets

(56) References Cited

U.S. PATENT DOCUMENTS

| | | | | |
|---|---|---|---|---|
| 2011/0269492 | A1* | 11/2011 | Wang | H04L 5/003 455/509 |
| 2012/0039283 | A1* | 2/2012 | Chen | H04W 72/042 370/329 |
| 2012/0114021 | A1* | 5/2012 | Chung | H04B 7/155 375/211 |
| 2012/0155561 | A1* | 6/2012 | Seo | H04B 7/15542 375/260 |
| 2013/0039284 | A1* | 2/2013 | Marinier | H04L 5/001 370/329 |
| 2013/0039291 | A1* | 2/2013 | Blankenship | H04L 5/001 370/329 |
| 2013/0044693 | A1* | 2/2013 | Lindh | H04L 5/0026 370/329 |
| 2013/0064174 | A1* | 3/2013 | Kim | H04B 7/15528 370/315 |
| 2013/0188566 | A1* | 7/2013 | Zhu | H04W 72/042 370/329 |
| 2013/0195041 | A1* | 8/2013 | Papasakellariou | H04W 72/042 370/329 |
| 2013/0230017 | A1* | 9/2013 | Papasakellariou | H04W 72/0406 370/330 |
| 2014/0022988 | A1* | 1/2014 | Davydov | H04B 7/024 370/328 |
| 2015/0373696 | A1* | 12/2015 | Han | H04L 1/1861 370/329 |

OTHER PUBLICATIONS

LG Electronics, "Fallback Operation for a UE configured with ePDCCH," 3GPP TSG RAN WG1 Meeting #69, R1-122311, May 2012 4 pages.

Samsung, "Fallback Operation for ePDCCH Scheduling," R1-122257, May 2012, 4 pages.

Huawei, et al., "Discussion on non-PMI based feedback in Rel-10," 3GPP TSG RAN WG1 #63bis, R1-110013, Jan. 2011, 5 pages.

PCT International Application No. PCT/KR2013/006723, Written Opinion of the International Searching Authority dated Dec. 2, 2013, 15 pages.

* cited by examiner

FIG. 6
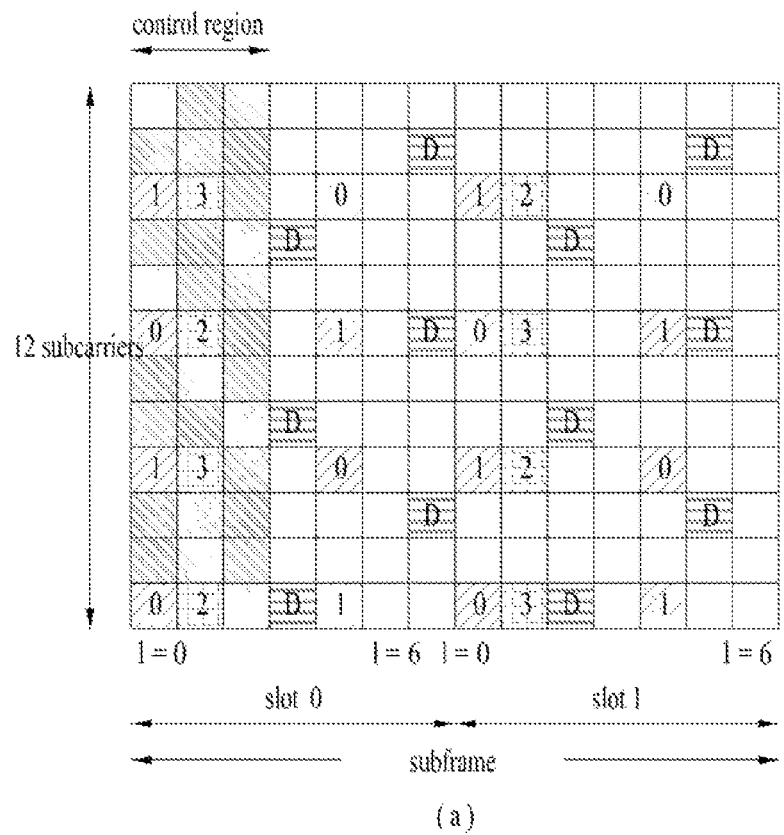
(a)
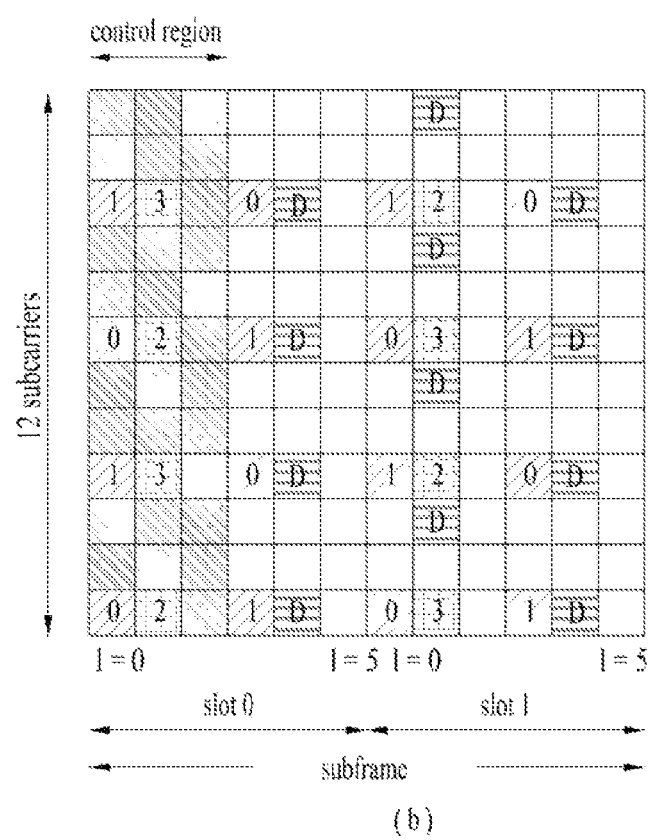
(b)

METHOD AND APPARATUS FOR RECEIVING DOWNLINK SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2013/006723, filed on Jul. 26, 2013, which claims the benefit of U.S. Provisional Application Ser. No. 61/676,343, filed on Jul. 27, 2012, the contents of which are hereby incorporated by reference herein in their entirety.

TECHNICAL FIELD

The present invention relates to a wireless communication system, and more particularly, to a method and apparatus for receiving a downlink signal if an enhanced physical downlink channel (EPDCCH) is applied.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DISCLOSURE

Technical Problem

An object of the present invention devised to solve the conventional problem is to provide a method for determination of a PDSCH transmission scheme corresponding to a fallback mode DCI format if control information is received through an EPDCCH.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a first technical aspect of the present invention, a method for enabling a user equipment to receive a downlink signal through an enhanced physical downlink control channel (EPDCCH) in a wireless communication system comprises the steps of decoding a fallback downlink control information (DCI) format in an EPDCCH physical resource block set; and receiving a physical downlink shared channel (PDSCH) on the basis of the fallback DCI format, wherein a PDSCH transmission scheme for receiving the PDSCH is determined depending on whether the EPDCCH physical resource block set corresponds to localized EPDCCH transmission or distributed EPDCCH transmission.

In a second technical aspect of the present invention, a user equipment in a wireless communication system comprises a reception module; and a processor, wherein the processor decodes a fallback downlink control information (DCI) format in an EPDCCH physical resource block set and receives a physical downlink shared channel (PDSCH) on the basis of the fallback DCI format, and a PDSCH transmission scheme for receiving the PDSCH is determined depending on whether the EPDCCH physical resource block set corresponds to localized EPDCCH transmission or distributed EPDCCH transmission.

The first and second technical aspects of the present invention may include the followings.

The user equipment may determine the PDSCH transmission scheme as transmission of a single antenna port if the EPDCCH physical resource block set is configured as localized EPDCCH transmission.

The single antenna port may be the antenna port used for EPDCCH transmission related to the fallback DCI format.

The single antenna port may be a representative one of antenna ports allocated to an enhanced control channel element (ECCE) related to the fallback DCI format.

The single antenna port may be related to a demodulation reference signal.

The single antenna port may be an antenna port 7.

The user equipment may determine the PDSCH transmission scheme depending on any one of a transmission mode or a predetermined transmission scheme if the EPDCCH physical resource block set is configured as distributed EPDCCH transmission.

The predetermined transmission scheme may be single antenna port transmission.

The single antenna port may be used for EPDCCH transmission related to the fallback DCI format.

The single antenna port may be a representative one of antenna ports allocated to the ECCE related to the fallback DCI format.

A PDSCH transmission scheme indicator may indicate whether the PDSCH transmission scheme is determined depending on the transmission mode or the predetermined transmission scheme.

The PDSCH transmission scheme based on the transmission mode may include single antenna port transmission and transmission diversity.

The EPDCCH and the PDSCH may be transmitted on the same carrier.

Advantageous Effects

According to the present invention, a PDSCH transmission scheme corresponding to a fallback mode DCI format may be determined considering an EPDCCH transmission mode, a scheduling mode, etc. in addition to a determination scheme based on a transmission mode of the related art.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating a reference signal;

BEST MODE FOR CARRYING OUT THE INVENTION

Figure 1:
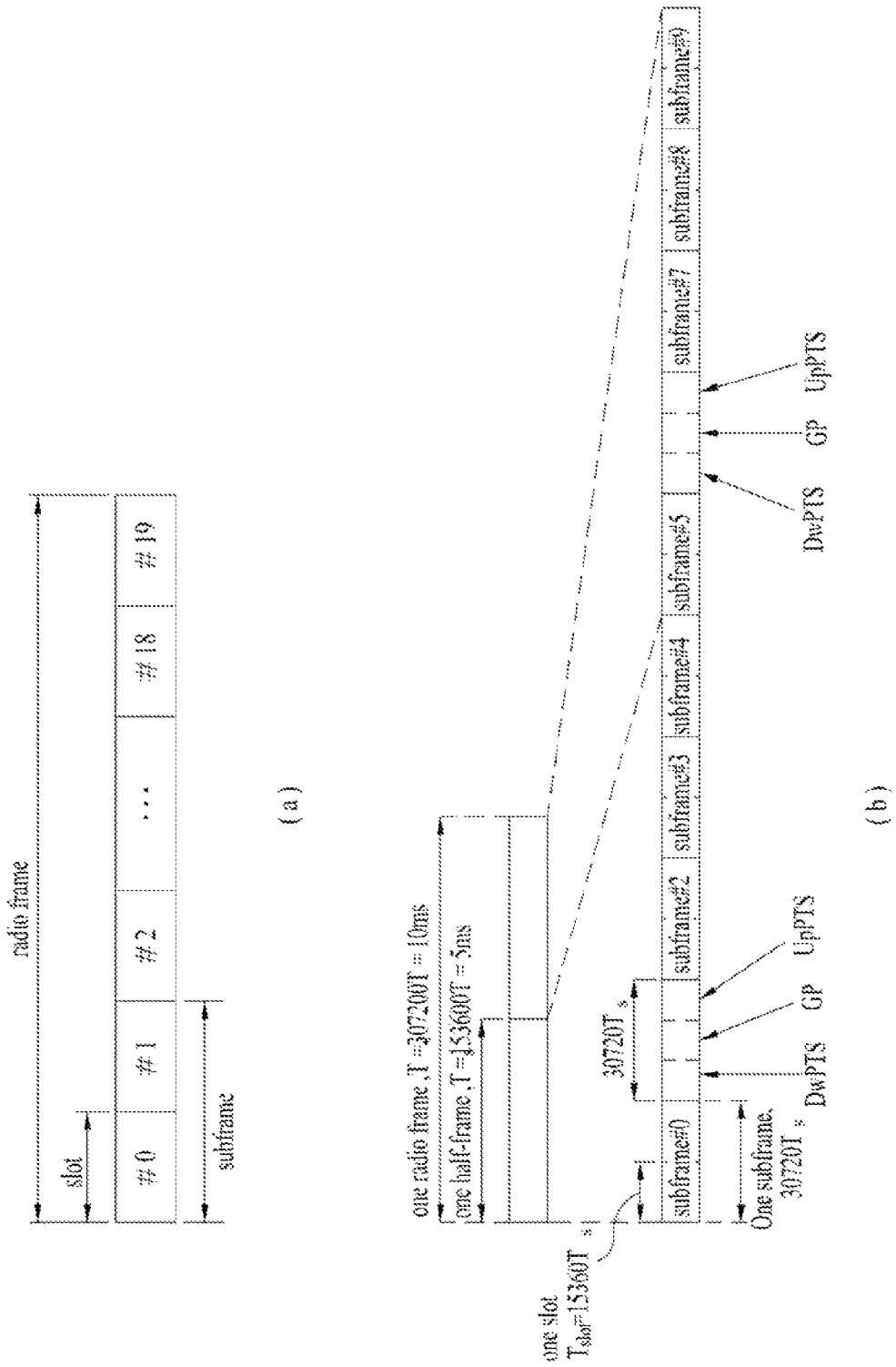
FIG. 1 is a diagram illustrating a structure of a radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to others. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or network nodes other than the base station. The term base station (BS) may be replaced with the terms fixed station, Node-B, eNode-B (eNB), or access point (AP) as necessary. The term relay may be replaced with the terms relay node (RN) or relay station (RS). The term terminal may also be replaced with the term user equipment (UE), mobile station (MS), mobile subscriber station (MSS) or subscriber station (SS).

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of radio access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE. WiMAX can be explained by IEEE 802.16e standard (WirelessMAN-OFDMA Reference System) and advanced IEEE 802.16m standard (WirelessMAN-OFDMA Advanced system). For clarity, the following description focuses on a 3GPP LTE and 3GPP LTE-A system. However, technical features of the present invention are not limited thereto.

LTE/LTE-A Resource Structure/Channel

Referring to FIG. 1, the structure of a radio frame will be described.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in downlink, an OFDM symbol indicates one symbol period. The OFDM symbol may be referred to as an SC-FDMA symbol or symbol period. A RB as a resource assignment unit may include a plurality of consecutive subcarriers in one slot.

The number of OFDM symbols included in one slot may be changed according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of first two or three OFDM symbols of each subframe may be assigned to a physical downlink control channel (PDCCH) and the remaining OFDM symbols may be assigned to a physical downlink shared channel (PDSCH).

FIG. 1(b) shows the structure of the type-2 radio frame. The type-2 radio frame includes two half frames and each half frame includes five subframes, a downlink pilot time slot (DwPTS), a guard period (GP) and an uplink pilot time slot (UpPTS). One subframe includes two slots. The DwPTS is used for initial cell search, synchronization or channel estimation of a UE. The UpPTS is used for channel estimation of a BS and uplink transmission synchronization of a UE. The GP is used to eliminate interference generated in uplink due to multi-path delay of a downlink signal between uplink and downlink.

The structure of the radio frame is only exemplary and the number of subframes included in the radio frame, the number of slots included in the subframe, or the number of symbols included in the slot may be variously changed.

Figure 2:
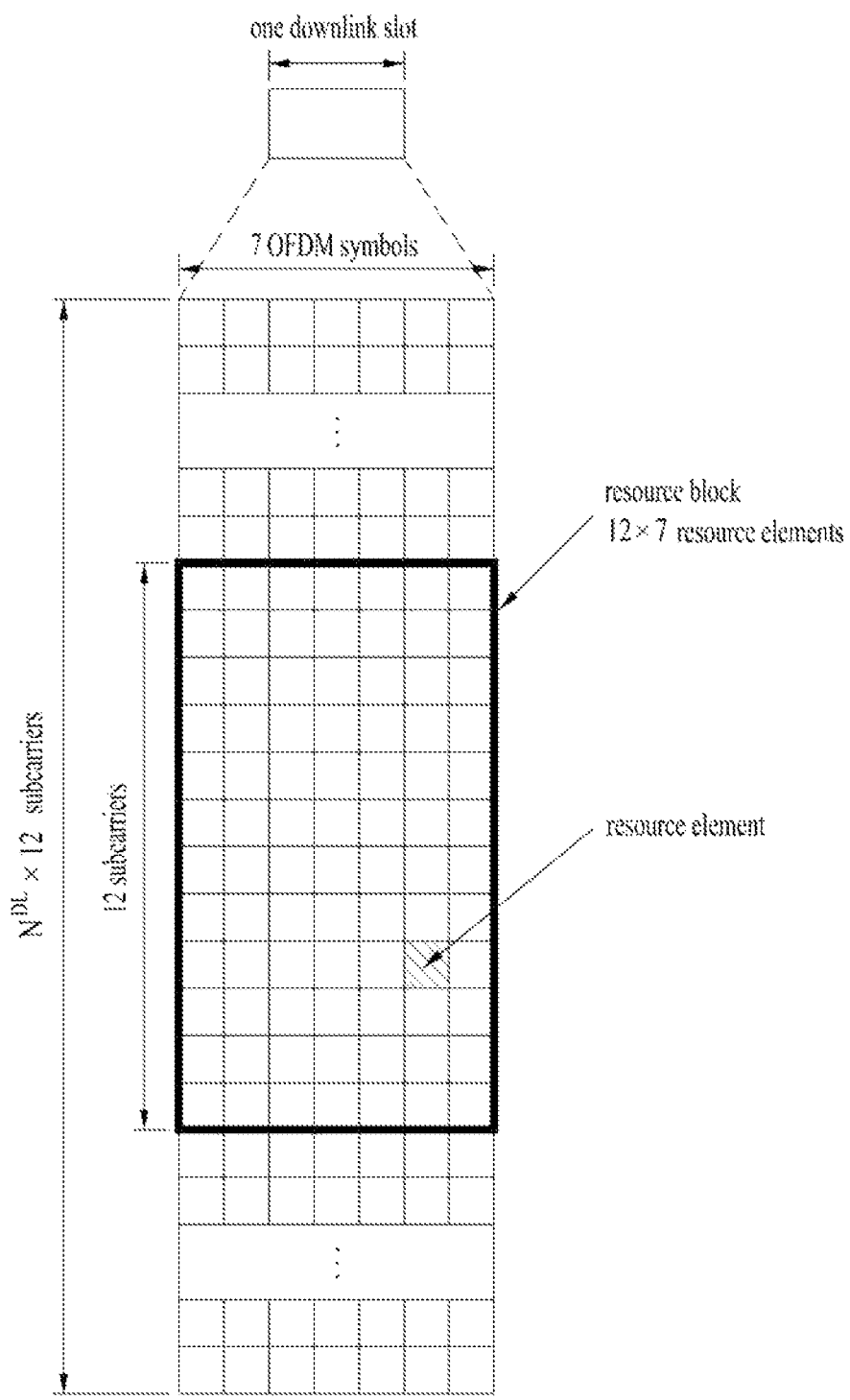
FIG. 2 is a diagram illustrating a resource grid at a downlink slot.

FIG. 2 is a diagram showing a resource grid of a downlink slot. Although one downlink slot may include seven OFDM symbols in a time domain and one RB may include 12 subcarriers in a frequency domain, the present invention is not limited thereto. For example, one slot includes 7 OFDM symbols in a normal cyclic prefix (CP), whereas one slot includes six OFDM symbols in an extended CP. Each element on the resource grid is referred to as a resource element (RE). One RB includes 12×7 REs. The number $N^{DL}$ of RBs included in a downlink slot depends on downlink transmission bandwidth. The structure of the uplink slot may be equal to that of the downlink slot.

Figure 3:
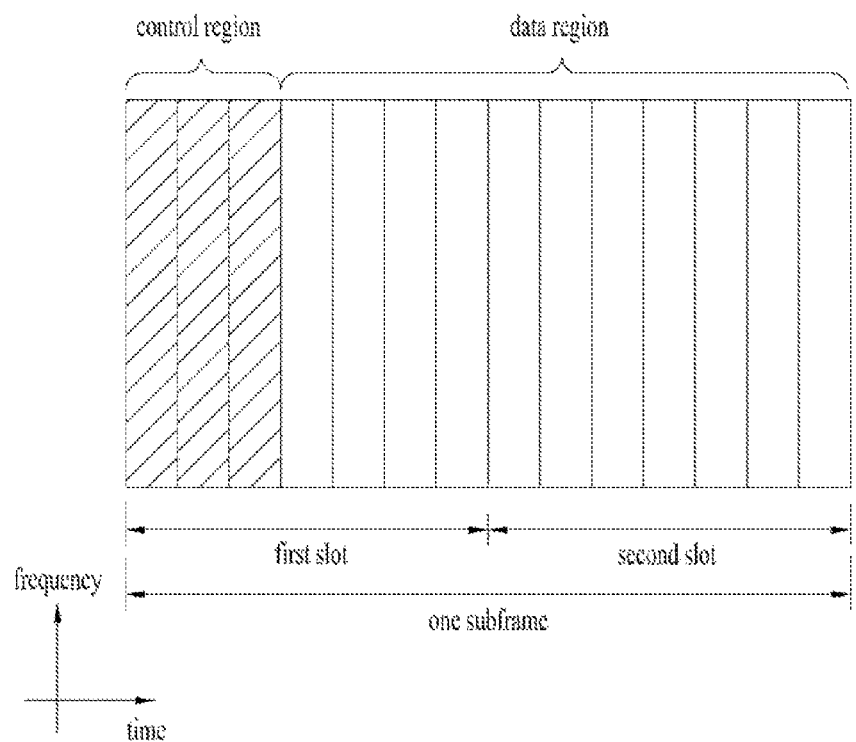
FIG. 3 is a diagram illustrating a structure of a downlink subframe.

FIG. 3 is a diagram showing the structure of a downlink subframe. A maximum of three OFDM symbols of a front portion of a first slot within one subframe corresponds to a control region to which a control channel is assigned. The remaining OFDM symbols correspond to a data region to which a Physical Downlink Shared Channel (PDSCH) is assigned. Examples of the downlink control channels used in 3GPP LTE include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted on a first OFDM symbol of a subframe, and includes information about the number of OFDM symbols used to transmit the control channel within the subframe. The PHICH includes a HARQ ACK/NACK signal in response to uplink transmission. The control information transmitted through the PDCCH is referred to as Downlink Control Information (DCI). The DCI includes uplink resource assignment information, downlink resource assignment information or an uplink transmit power control command for an arbitrary UE group. The PDCCH may include resource assignment and transmission format of a Downlink Shared Channel (DL-SCH), resource assignment information of an Uplink Shared Channel (UL-SCH), paging information of a Paging Channel (PCH), system information on the DL-SCH, resource assignment of an higher layer control message such as a Random Access Response (RAR) transmitted on the PDSCH, a set of transmit power control commands for an individual UEs in an arbitrary UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or more contiguous control channel elements (CCEs). The CCE is a logical assignment unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB determines a PDCCH format according to DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
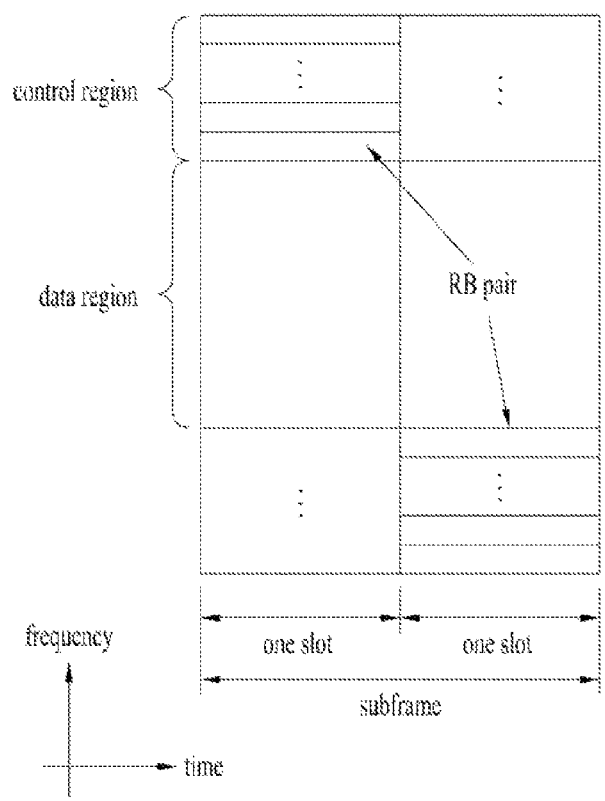
FIG. 4 is a diagram illustrating a structure of an uplink subframe.

FIG. 4 is a diagram showing the structure of an uplink frame. The uplink subframe may be divided into a control region and a data region in a frequency domain. A Physical Uplink Control Channel (PUCCH) including uplink control information is assigned to the control region. A Physical uplink Shared Channel (PUSCH) including user data is assigned to the data region. In order to maintain single carrier property, one UE does not simultaneously transmit the PUCCH and the PUSCH. The PUCCH for one UE is assigned to a RB pair in a subframe. RBs belonging to the RB pair occupy different subcarriers with respect to two slots. Thus, the RB pair assigned to the PUCCH is "frequency-hopped" at a slot boundary.

DCI Format

According to current LTE-A (release 10), DCI formats 0, 1, 1A, 1B, 1C, 1D, 2, 2A, 2B, 2C, 3, 3A and 4 are defined. Here, DCI formats 0, 1A, 3 and 3A are defined to have the same message size in order to reduce the number of times of blind decoding. Such DCI formats may be divided into i) DCI formats 0 and 4 used for uplink grant, ii) DCI formats 1, 1A, 1B, 1C, 1D, 2, 2A, 2B and 2C used for downlink scheduling assignment, and iii) DCI formats 3 and 3A for power control command, according to usage of control information to be transmitted.

DCI format 0 used for uplink grant may include a carrier indicator necessary for carrier aggregation, an offset used for differentiating between DCI formats 0 and 1A (flag for format 0/format 1A differentiation), a frequency hopping flag indicating whether frequency hopping is used for uplink PUSCH transmission, information about resource block assignment to be used by a UE for PUSCH transmission, a modulation and coding scheme, a new data indicator used to empty a buffer for initial transmission in association with a HARQ process, a TPC command for scheduled for PUSCH, a cyclic shift for demodulation reference signal (DMRS) and OCC index, an uplink (UL) index necessary for TDD operation and channel quality indicator (CQI) request information. Since DCI format 0 uses synchronization HARQ, a redundancy version is not included as in DCI formats related to downlink scheduling assignment. A carrier offset is not included in the DCI format if cross carrier scheduling is not used.

DCI format 4 is newly added in LTE-A release 10 in order to apply spatial multiplexing to uplink transmission in LTE-A. Since DCI format 4 further includes information about spatial multiplexing as compared to DCI format 0, DCI format 4 has a larger message size and further includes additional control information in addition to control information included in DCI format 0. That is, DCI format 4 further includes a modulation and coding scheme for a second transport block, precoding information for multi-antenna transmission and sounding reference signal (SRS) request information. Since DCI format 4 has a size greater than that of DCI format 0, DCI format 4 does not include an offset for differentiating between DCI formats 0 and 1A.

DCI formats 1, 1A, 1B, 1C, 1D, 2, 2A, 2B and 2C related to downlink scheduling assignment may be broadly divided into DCI formats 1, 1A, 1B, 1C and 1D which do not support spatial multiplexing and DCI formats 2, 2A, 2B and 2C which support spatial multiplexing.

DCI format 1C supports only consecutive frequency assignment as compact downlink assignment and does not include a carrier offset and a redundancy version as compared to other formats.

DCI format 1A is a format for downlink scheduling and random access procedure. DCI format 1A may include a carrier offset, an indicator indicating whether distributive downlink transmission is used, PDSCH resource assignment information, a modulation and coding scheme, a redundancy version, a HARQ processor number indicating a processor used for soft combining, a new data offset used to empty a buffer for initial transmission in association with a HARQ process, a transmit power control command for PUCCH and an uplink index necessary for TDD operation.

Most control information of DCI format 1 is similar to that of DCI format 1A. While DCI format 1A is related to consecutive resource assignment, DCI format 1 supports non-consecutive resource assignment. Accordingly, since DCI format 1 further includes a resource assignment header, control signaling overhead is slightly increased as resource assignment flexibility is increased.

DCI formats 1B and 1D are similar in that precoding information is further included as compared to DCI format 1. DCI format 1B includes PMI confirmation and DCI format 1D includes downlink power offset information. Most control information included in DCI formats 1B and 1C is equal to that of DCI format 1A.

DCI formats 2, 2A, 2B and 2C further include spatial multiplexing information in addition to most of the control information included in DCI format 1A. That is, a modulation and coding scheme for a second transport block, a new data offset and a redundancy version may be further included.

DCI format 2 supports closed-loop spatial multiplexing and DCI format 2A supports open-loop spatial multiplexing. DIC formats 2 and 2A include precoding information. DCI format 2B supports dual layer spatial multiplexing combined with beamforming and further includes cyclic shift information for DMRS. DCI format 2C may be understood as an extension of DCI format 2B and supports spatial multiplexing of up to eight layers.

DCI formats 3 and 3A may be used to supplement transmit power control information included in DCI formats for uplink grant and downlink scheduling assignment, that is, to support semi-persistent scheduling. In case of DCI format 3, a 1-bit command is used per UE and, in case of DCI format 3A, a 2-bit command is used per UE.

Any one of the above-described DCI formats may be transmitted via one PDCCH and a plurality of PDCCHs may be transmitted in a control region. The UE may monitor a plurality of PDCCHs.

PDCCH Processing

A control channel element (CCE), which is a consecutive logical assignment unit, is used when mapping PDCCHs to REs. One CCE includes a plurality (e.g., 9) of resource element groups (REGs) and one REG is composed of four neighboring REs in a state of excluding a reference signal (RS).

The number of CCEs necessary for a specific PDCCH is changed according to DCI payload which is a size of control information, cell bandwidth, channel coding rate, etc. More specifically, the number of CCEs for a specific PDCCH may be defined according to PDCCH format as shown in Table 1 below.

TABLE 1

| PDCCH format | Number of CCEs | Number of REGs | Number of bits of PDCCH |
| --- | --- | --- | --- |
| 0 | 1 | 9 | 72 |
| 1 | 2 | 18 | 144 |
| 2 | 4 | 36 | 288 |
| 3 | 8 | 72 | 576 |

A PDCCH may use any one of the four formats as described above. However, a UE is not informed of the PDCCH format. Accordingly, the UE should perform decoding in a state of being unaware of the PDCCH format, which is referred to as blind decoding. When the UE decodes all possible CCEs used for downlink with respect to each PDCCH format, a large burden is imposed on the UE. Therefore, a search space is defined in consideration of scheduling restrictions and the number of times of decoding.

That is, the search space is a set of candidate PDCCHs including CCEs which should be decoded by the UE at an aggregation levels. Here, the aggregation levels and the number of PDCCH candidates may be defined as shown in Table 2 below.

TABLE 2

| | Search space | | Number of |
| --- | --- | --- | --- |
| | Aggregation level | Size (CCE unit) | PDCCH candidates |
| UE-specific | 1 | 6 | 6 |
| | 2 | 12 | 6 |
| | 4 | 8 | 2 |
| | 8 | 16 | 2 |

TABLE 2-continued

| Search space | | Number of |
| --- | --- | --- |
| Aggregation level | Size (CCE unit) | PDCCH candidates |
| Common 4 | 16 | 4 |
| 8 | 16 | 2 |

As shown in Table 2, since four aggregation levels are present, the UE has a plurality of search spaces according to aggregation level. As shown in Table 2 above, the search space may be divided into a UE-specific search space and a common search space. The UE-specific search space is used for specific UEs. Each UE may monitor the UE-specific search space (attempt to decode the set of PDCCH candidates according to possible DCI format), check an RNTI and CRC masked to a PDCCH and acquire control information if the RNTI and CRC are valid.

The common search space is used when a plurality of UEs or all UEs need to receive a PDCCH, such as a dynamic scheduling or paging message of system information. The common search space may be used for a specific UE for resource management. In addition, the common search space may overlap the UE-specific search space.

The search space may be determined by Equation 1 below.

$$L\{(Y_k+m') \bmod \lfloor N_{CCE,k}/L \rfloor\}+i \qquad \text{Equation 1}$$

where, L denotes an aggregation level, $Y_k$ denotes a variable determined by an RNTI and a subframe number k, m' denotes the number of PDCCH candidates, which is m'=m+$M^{(L)} \cdot n_{CI}$ if carrier aggregation is applied and, otherwise, m'=m (m=0, . . . , $M^{(L)}$−1), $M^{(L)}$ denotes the number of PDCCH candidates, $N_{CCE,k}$ denotes a total number of CCEs of a control region at a k-th subframe, and i denotes a factor for specifying an individual CCE at each PDCCH candidate in a PDCCH (i=0, . . . , L−1) In a common search space, $Y_k$ is always set to 0.

Figure 5:
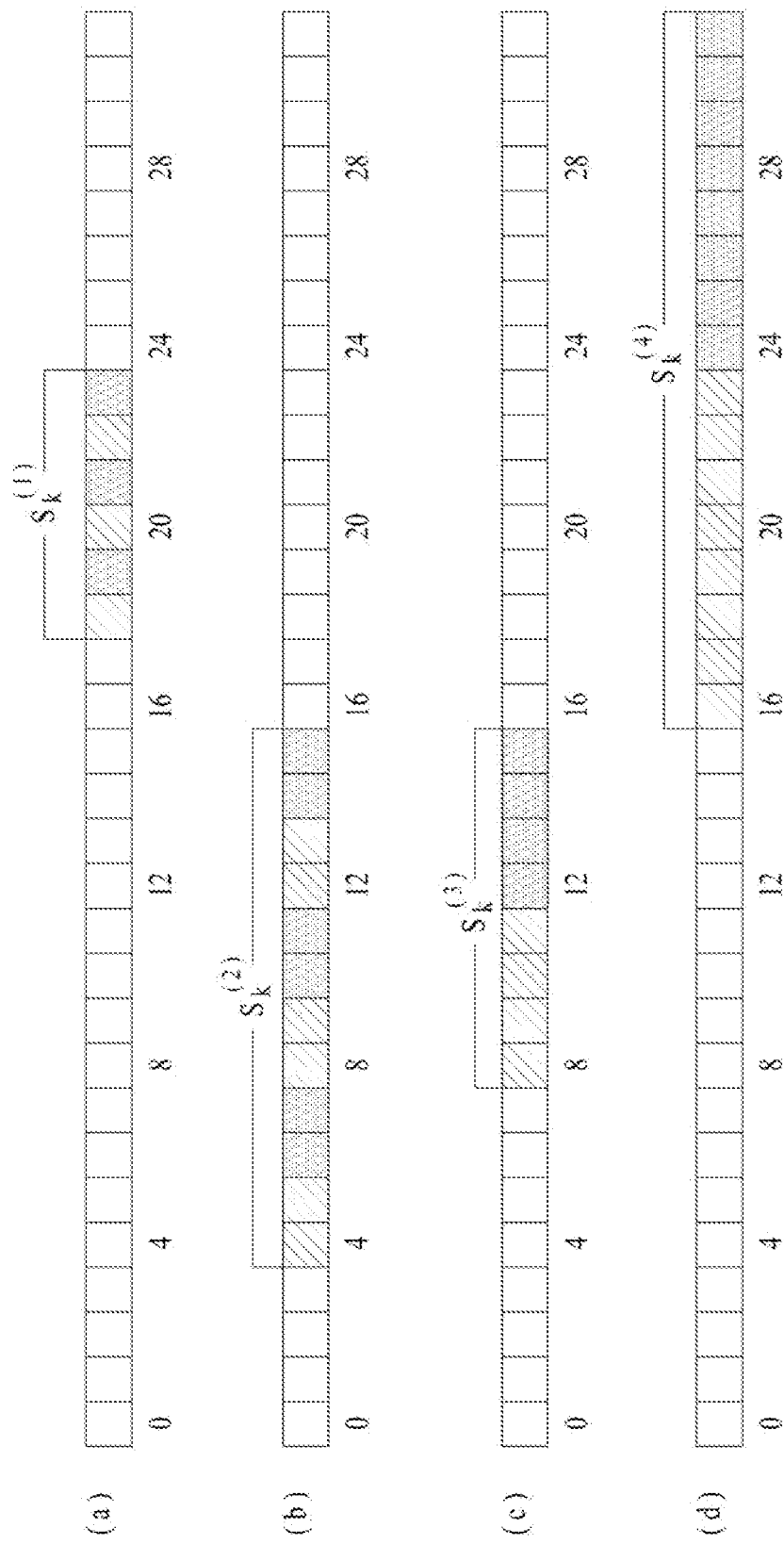
FIG. 5 is a diagram illustrating a search space.

FIG. 5 shows a UE-specific search space (shadow portion) at each aggregation level which may be defined according to Equation 1 above. Here, carrier aggregation is not used and $N_{CCE,k}$ is 32 for convenience of description.

FIGS. 5(a), (b), (c) and (d) respectively show aggregation levels 1, 2, 4 and 8 and a numeral denotes a CCE number. In FIG. 5, at each aggregation level, a start CCE of the search space is determined by the RNTI and the subframe number k as described above, may be differently determined according to aggregation level due to a modulo function and L within the same subframe with respect to one UE, and is always set to a multiple of the aggregation level due to L. Here, assume that $Y_k$ is a CCE number 18. At the start CCE, the UE sequentially attempts decoding in CCE units determined according to the aggregation level. For example, in FIG. 9(b), the UE attempts decoding from CCE number 4, which is the start CCE, in units of two CCEs according to aggregation level.

As described above, the UE attempts decoding with respect to the search space and the number of decoding attempts is determined by a transmission mode determined via DCI format and RRC signaling. If carrier aggregation is not applied, since the UE considers two DCI sizes (DCI format 0/1A/3/3a and DCI format 1C) with respect to six PDCCH candidates in the common search space, a maximum of 12 decoding attempts is necessary. In the UE-specific search space, since two DCI sizes are considered with respect to the number (6+6+2+2=16) of PDCCH candidates, a maximum of 32 decoding attempts is necessary. Accordingly, if carrier aggregation is not applied, a maximum of 44 decoding attempts is necessary.

If carrier aggregation is applied, the number of times of decoding for the UE-specific search space and DCI format is increased by the number of downlink resources (component carriers). Thus, a maximum number of times of decoding is further increased.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. This signal is referred to as a pilot signal or a reference signal.

If data is transmitted and received using multiple antennas, a channel state between each transmission antenna and each reception antenna should be known in order to accurately receive a signal. Accordingly, a reference signal is present per transmit antenna and, more particularly, per antenna port.

The reference signal may be divided into an uplink reference signal and a downlink reference signal. In a current LTE system, the uplink reference signal includes:
 i) a demodulation reference signal (DM-RS) for channel estimation for coherent demodulation of information transmitted via a PUSCH and a PUCCH, and
 ii) a sounding reference signal (SRS) for measuring uplink channel quality of a network at different frequencies at the BS.

The downlink reference signal includes:
 i) a cell-specific reference signal (CRS) shared by all UEs in the cell,
 ii) a UE-specific reference signal for a specific UE,
 iii) a demodulation-reference signal (DM-RS) transmitted for coherent demodulation if a PDSCH is transmitted,
 iv) a channel state information-reference signal (CSI-RS) for delivering channel state information (CSI) if a downlink DMRS is transmitted,
 v) an MBSFN reference signal transmitted for coherent demodulation of a signal transmitted in a multimedia broadcast single frequency network (MBSFN) mode, and
 vi) a positioning reference signal used to estimate geographic position information of the UE.

The reference signals may be broadly divided into two reference signals according to the purpose thereof. There are a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation. The CRS is transmitted per subframe over a wide band and reference signals for a maximum of four antenna ports are transmitted according to the number of transmit antennas of the eNB.

For example, if the number of transmit antennas of the eNB is 2, CRSs for antenna ports 0 and 1 are transmitted and, if the number of transmit antennas of the eNB is 4, CRSs for antenna ports 0 to 3 are transmitted.

FIG. 6 is a diagram illustrating a pattern in which CRSs and DRSs defined in a legacy 3GPP LTE system (e.g., release-8) are mapped onto downlink resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 6(a)) and 12 OFDM symbols in case of an extended CP (FIG. 6(b)), in the time domain.

FIG. 6 shows locations of the reference signals on the RB pairs in a system in which the eNB supports four transmit antennas. In FIG. 6, resource elements (REs) denoted by "0", "1", "2" and "3" represent the locations of the CRSs for antenna port indices 0, 1, 2 and 3. Meanwhile, the RE denoted by "D" represents the location of the DMRS.

Carrier Aggregation

Figure 7:
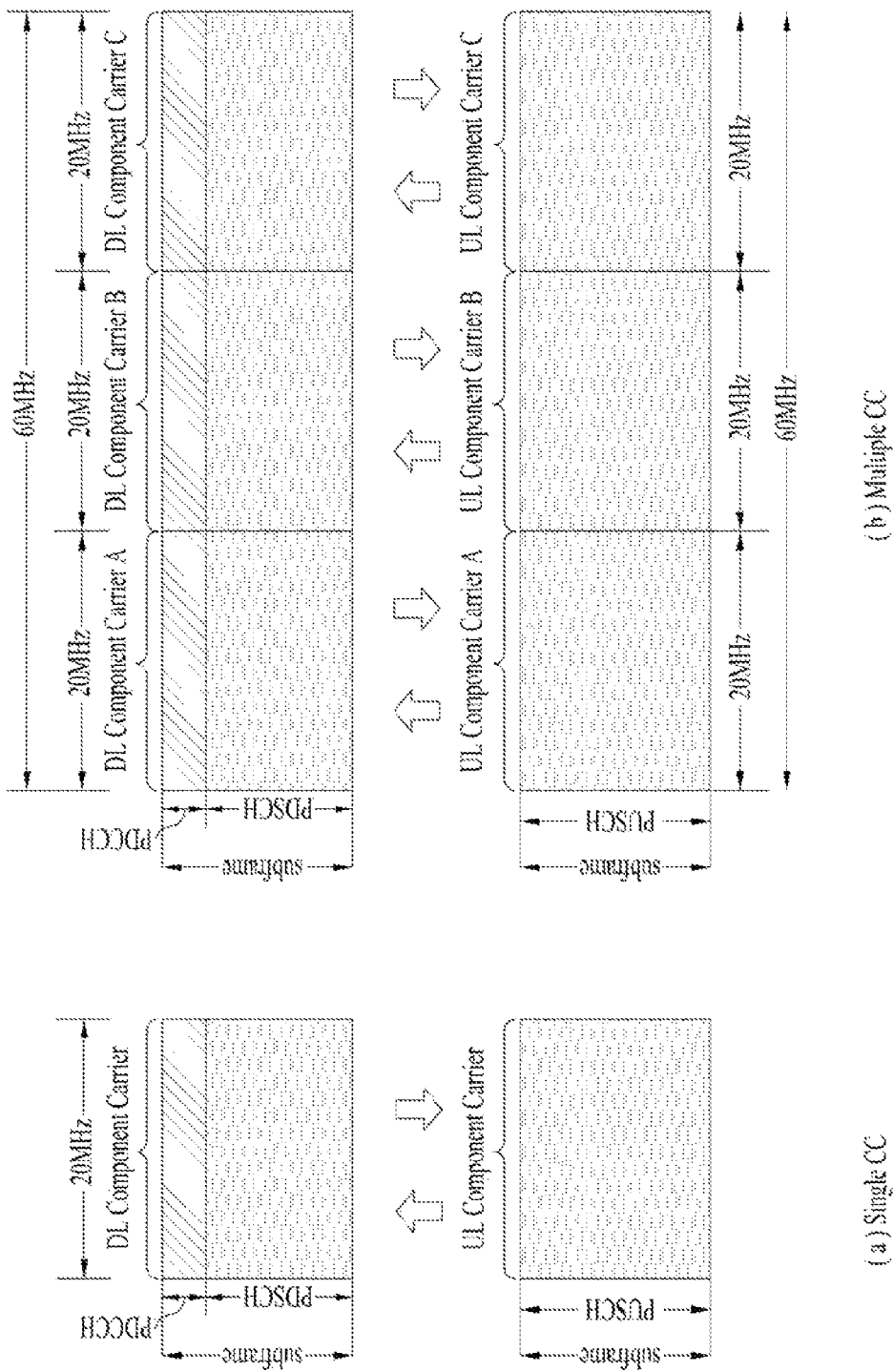
FIG. 7 is a diagram illustrating carrier aggregation.

FIG. 7 is a diagram illustrating carrier aggregation. Prior to description of carrier aggregation, a concept of a cell introduced to manage radio resources in the LTE-A system will be described. The cell may be understood by combination of downlink resource and uplink resource. In this case, the uplink resource is not required necessarily, and thus the cell may be comprised of the downlink resource only or may be comprised of the downlink resource and the uplink resource. However, this is defined in the current LTE-A release 10 system. As an opposite case, the cell may be comprised of the uplink resource only. The downlink resource may be referred to as a downlink component carrier (DL CC), and the uplink resource may be referred to as an uplink component carrier (UL CC). The DL CC and the UL CC may be expressed as a carrier frequency, which means a center frequency at a corresponding cell.

The cell may be categorized into a primary cell (PCell) operated at a primary frequency and secondary cells (SCells) operated at a secondary frequency. The PCell and the SCells may be referred to as serving cells. The PCell may be a cell indicated when the user equipment performs initial connection establishment, connection re-establishment, or handover. That is, the PCell may be understood as a cell which is a core of control under a carrier aggregation environment, which will be described later. The user equipment may be allocated with a PUCCH from its PCell, and may transmit the PUCCH. The SCells may be configured after radio resource control (RRC) connection establishment is performed, and may be used to provide additional radio resource. Under the carrier aggregation environment, the other serving cells except the PCell may be regarded as the SCells. In case of the user equipment, which is in RRC_CONNECTED state but is not configured by carrier aggregation, or which does not support carrier aggregation, only one serving cell comprised of PCell only exists. On the other hand, in case of the user equipment which is in RRC_CONNECTED state and is configured by carrier aggregation, one or more serving cells exist, and the entire serving cells include the PCell and all the SCells. For the user equipment that supports carrier aggregation, the network may configure one or more SCells in addition to the PCell configured initially during connection establishment after initial security activation is initiated.

Hereinafter, carrier aggregation will be described with reference to FIG. 7. Carrier aggregation is the technology introduced to use a wider bandwidth to satisfy the demand of a high transmission rate. Carrier aggregation may be defined by aggregation of two or more component carriers (CCs) of which carrier frequencies are different from each other. Referring to FIG. 7, FIG. 7(a) illustrates a subframe when one CC is used in the existing LTE system, and FIG. 7(b) illustrates a subframe when carrier aggregation is used. In FIG. 7(b), three CCs of 20 MHz are exemplarily used to support a bandwidth of 60 MHz. In this case, the respective CCs may be continuous or not.

The user equipment may simultaneously receive downlink signals through a plurality of DL CCs and monitor the downlink signals. A linkage between each DL CC and UL CC may be indicated by system information. DL CC/UL CC link may be fixed to the system or may be configured semi-statically. Also, even though a system full bandwidth includes N number of CCs, a frequency bandwidth that may be monitored and received by a specific user equipment may be limited to M(<N) number of CCs. Various parameters for carrier aggregation may be configured cell-specifically, UE group-specifically, or UE-specifically.

Figure 8:
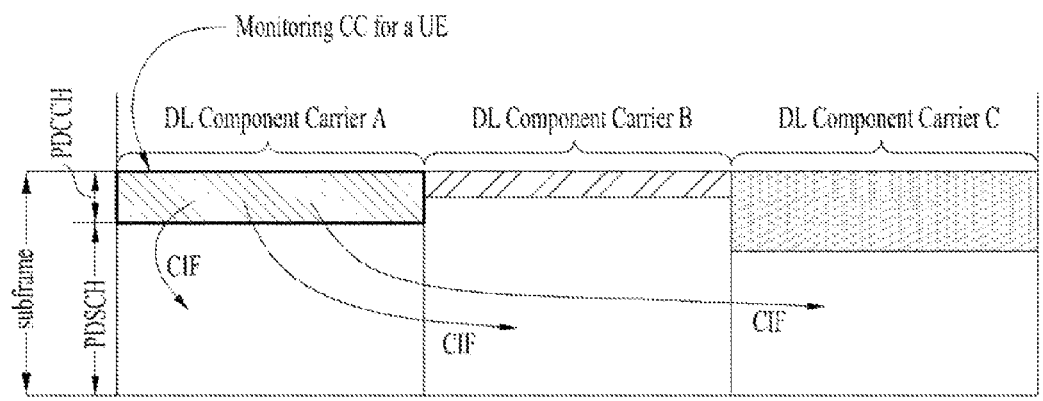
FIG. 8 is a diagram illustrating cross-carrier scheduling.

FIG. 8 is a diagram illustrating cross-carrier scheduling. Cross-carrier scheduling means that a control region of DL CC of any one of a plurality of serving cells includes downlink scheduling allocation information of the other DL CCs, or means that a control region of DL CC of any one of a plurality of serving cells includes uplink scheduling grant information of a plurality of UL CCs linked to the corresponding DL CC.

First of all, a carrier indictor field (CIF) will be described.

The CIF may be included or not in the DCI format transmitted through the PDCCH as described above. If the CIF is included in the DCI format, it indicates that cross-carrier scheduling is applied. If cross-carrier scheduling is not applied, downlink scheduling allocation information is valid on the DL CC to which downlink scheduling allocation information is currently transmitted. Also, uplink scheduling grant is valid for one UL CC linked with the DL CC to which the downlink scheduling allocation information is transmitted.

If cross-carrier scheduling is applied, the CIF indicates CC related to the downlink scheduling allocation information transmitted from any one DL CC through the PDCCH. For example, referring to FIG. 8, downlink allocation information on DL CC B and DL CC C, that is, information on PDSCH resource is transmitted through the PDCCH within a control region on DL CC A.

Whether the CIF is included or not in the PDCCH may be configured semi-statically, and may be enabled UE-specifically by higher layer signaling. If the CIF is disabled, the PDCCH on a specific DL CC may allocate PDSCH resource on the corresponding same DL CC and allocate PUSCH resource on UL CC linked to the specific DL CC. In this case, a coding scheme, CCE based resource mapping, DCI format, which are the same as those of the existing PDCCH structure, may be applied.

Meanwhile, if the CIF is enabled, the PDCCH on the specific DL CC may allocate PDSCH/PUSCH resource on one DL/UL CC, which is indicated by the CIF, among a plurality of aggregated CCs. In this case, the CIF may additionally be defined in the existing PDCCH DCI format. The CIF may additionally be defined the existing PDCCH DCI format as a field of fixed 3 bit length, or its location may be fixed regardless of the size of the DCI format. Even in this case, the coding scheme, CCE based resource mapping, DCI format, which are the same as those of the existing PDCCH structure, may be applied.

Even in the case that the CIF exists, the base station may allocate a DL CC set for monitoring the PDCCH. Accordingly, load of blind decoding may be reduced in view of the user equipment. The PDCCH monitoring CC set is a part of the aggregated DL CC, and the user equipment may perform detection/decoding of the PDCCH for the corresponding CC set only. That is, in order to perform PDSCH/PUSCH scheduling for the user equipment, the base station may transmit the PDCCH on the PDCCH monitoring CC set only. The PDCCH monitoring DL CC set may be configured UE-specifically, UE group-specifically, or cell-specifically. For example, if three DL CCs are aggregated as illustrated in FIG. 8, the DL CC A may be set to the PDCCH monitoring DL CC. If the CIF is disabled, the PDCCH on each DL CC may schedule the PDSCH only on the DL CC A. Meanwhile, if the CIF is enabled, the PDCCH on the DL CC A may schedule the PDSCH on the other DL CC as well as the DL CC A. If the DL CC A is set to the PDCCH monitoring CC, the PDSCH is not transmitted to the DL CC B and the DL CC C.

Transmission Mode

The base station may configure a transmission mode through UE-specific higher layer signaling in accordance with a channel status with the user equipment. The user equipment may determine a DCI format to be decoded by itself and a transmission scheme of a PDSCH (that is, PDSCH corresponding to PDCCH) indicated by downlink (DL) allocation of each DCI format, in addition to a DCI format 1A (fallback mode DCI) which should always be decoded at a UE-specific search space, in accordance with the transmission mode. The following Table 3 illustrates this relation.

TABLE 3

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission of antenna ports 7 and 8 or single-antenna port, antenna port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 or single antenna port of antenna port 7 or 8 |

TABLE 3-continued

| Transmission mode | DCI format | Search Space | Transmission scheme of PDSCH corresponding to PDCCH |
|---|---|---|---|
| Mode 10 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
| | DCI format 2D | UE specific by C-RNTI | Up to 8 layer transmission, ports 7-14 or single antenna port of antenna port 7 or 8 |

As will be aware of it from Table 3 above, if the DCI format 1A is configured, the user equipment may recognize and regard single antenna port transmission based on port 0, transmission diversity based on two or more ports, and single antenna port transmission based on port 7 as PDSCH transmission schemes in accordance with the transmission modes.

Enhanced-PDCCH (EPDCCH)

The LTE system after release 11 considers an enhanced PDCCH (EPDCCH) that may be transmitted through a conventional PDSCH region, as a solution of PDCCH capacity shortage caused by Coordinate Multi Point (CoMP), Multi User-Multiple Input Multiple Output (MU-MIMO), etc. and PDCCH throughput reduction caused by inter-cell interference. Also, unlike conventional CRS based PDCCH, DMRS based channel estimation may be performed for the EPDCCH to obtain precoding gain.

EPDCCH transmission may be divided into localized EPDCCH transmission and distributed EPDCCH transmission depending on configuration of PRB (Physical Resource Block) pair used for EPDCCH transmission. The localized EPDCCH transmission means that ECCEs used for one DCI transmission are adjacent to one another in a frequency domain, and specific precoding may be applied to the localized EPDCCH transmission to obtain beamforming gain. For example, the localized EPDCCH transmission may be based on continuous ECCEs corresponding to an aggregation level. On the other hand, the distributed EPDCCH transmission means that one EPDCCH is transmitted from PRB pair spaced apart from the frequency domain, and has gain in view of frequency diversity. For example, the distributed EPDCCH transmission may be based on ECCE comprised of four EREGs included in each PRB pair spaced apart from the frequency domain.

The user equipment may perform blind decoding similarly to the existing LTE/LTE-A system to receive and acquire downlink control information (DCI) through the EPDCCH. In more detail, the user equipment may attempt (monitor) decoding for a set of EPDCCH candidates per aggregation level for DCI formats corresponding to a set transmission mode. In this case, the set of the EPDCCH candidates for monitoring may be referred to as EPDCCH UE-specific search space, which may be set/configured per aggregation level. Also, the aggregation level of {1, 2, 4, 8, 16, 32} may be configured in accordance with subframe type, CP length, available resource amount within the PRB pair, etc. differently from the existing LTE/LTE-A system.

The user equipment configured by the EPDCCH may index REs included in the PRB pair set to EREG and again index the EREG to ECCE unit. The user equipment may determine EPDCCH candidates, which constitute the search space, on the basis of the indexed ECCE and perform blind decoding, thereby receiving control information. In this case, the EREG is a concept corresponding to REG of the existing LTE/LTE-A system, and the ECCE is a concept corresponding to CCE. 16 EREGs may be included in one PRB pair.

In the meantime, DCI format 1A is used as fallback mode DCI even in the aforementioned EPDCCH. In this case, the transmission scheme of the corresponding PDSCH may be determined depending on the transmission mode as illustrated in Table 3. However, beamforming used for EPDCCH transmission is suitable for the EPDCCH, especially localized EPDCCH transmission, whereby DMRS based transmission may be used even for the PDSCH corresponding to the fallback mode DCI. Accordingly, in the present invention, a method for determining a transmission scheme of a PDSCH corresponding to a case where a user equipment decodes a fallback mode DCI format through EPDCCH will be described.

Figure 9:
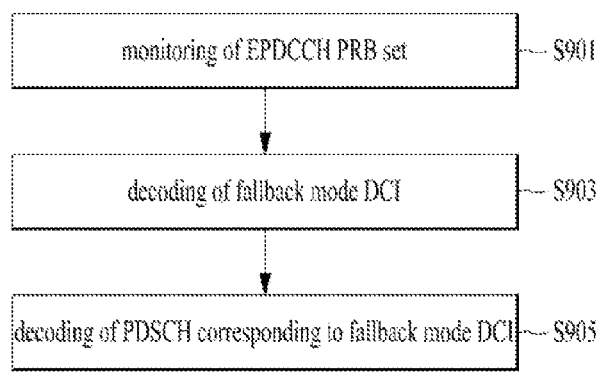
FIGS. 9 to 11 are diagrams illustrating determination of a PDSCH transmission scheme corresponding to a fallback mode DCI format according to the embodiment of the present invention.

FIG. 9 illustrate a procedure of receiving a PDSCH corresponding to a fallback mode DCI format of a user equipment in accordance with the embodiment of the present invention. Referring to FIG. 9, at step S901, the user equipment monitors one or two EPDCCH RPB sets configured by RRC signaling. At step S903, the user equipment may decode the fallback mode DCI. At step S905, the user equipment may decode the PDSCH corresponding to the fallback mode DCI format on the basis of EPDCCH transmission scheme, scheduling mode and/or PDSCH transmission scheme determined by higher layer signaling (for example, RRC signaling).

Determination of PDSCH Transmission Scheme Based on EPDCCH Transmission Scheme

The PDSCH transmission scheme corresponding to fallback DCI format (DCI format 1A) may be determined depending on what a fallback DCI format/transmission scheme of EPDCCH is. In other words, the PDSCH transmission scheme corresponding to fallback DCI format may be determined depending on whether the fallback DCI format/EPDCCH is based on distributed EPDCCH transmission or localized EPDCCH transmission. That is, the PDSCH transmission scheme may be determined depending on whether EPDCCH PRB set that has monitored the fallback DCI format corresponds to localized EPDCCH transmission or distributed EPDCCH transmission.

In more detail, if the transmission scheme of the EPDCCH corresponds to localized transmission, the PDSCH transmission scheme indicated by the fallback DCI format may be determined as single (antenna) port transmission. In this case, the single antenna port may be a predetermined port (for example, port 7 which is DMRS port), a port to which the EPDCCH is transmitted, or an antenna port designated by RRC signaling. Since the EPDCCH precoded based on channel status reporting of the user equipment is transmitted in case of localized transmission, it is likely that corresponding beamforming is favorable for the user equipment. Accordingly, even in the PDSCH transmission scheme, DMRS based transmission may be suitable for the corresponding user equipment.

Figure 10:
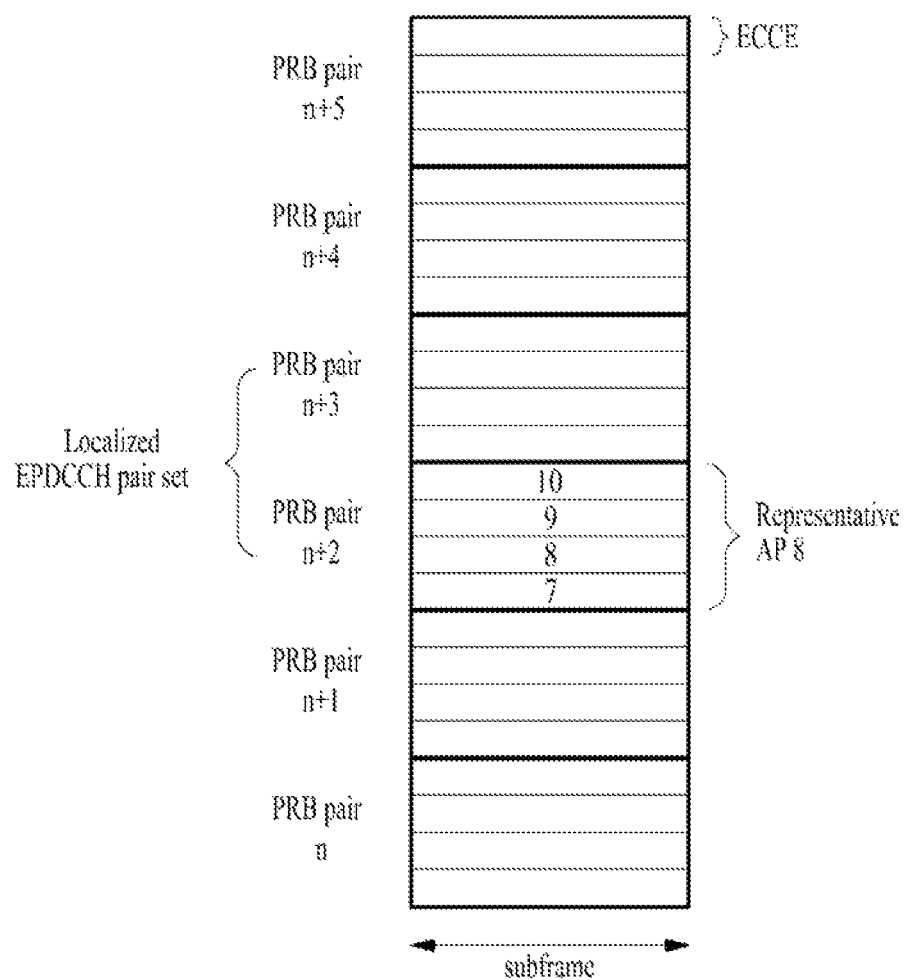

As an example of the single antenna port, the port to which the EPDCCH is transmitted may be a representative one of antenna ports of the ECCE to which the fallback DCI format is transmitted. For example, if one localized EPDCCH RPB set (which includes PRB pairs n+2 and n+3) is configured for the user equipment as shown in FIG. 10, the aggregation level of the DCI format 1A is 4 and the DCI format 1A is transmitted using a representative antenna port 8 of the antenna ports 7, 8, 9 and 10 allocated to the ECCE, the PDSCH corresponding to the DCI format 1A may be transmitted through the representative antenna port.

Although the EPDCCH is transmitted in accordance with localized transmission, for the case where it is difficult to perform scheduling of ports, resources, etc., a predetermined indicator (for example, first PDSCH transmission scheme indicator, which may be transmitted by higher layer signaling, such as RRC, DCI format, etc.) may indicate whether to use the aforementioned single antenna port as the PDSCH transmission scheme or use the transmissions scheme (that is, transmission scheme determined in accordance with a transmission mode) determined in accordance with Table 3.

In the meantime, if the transmission scheme of the EPDCCH corresponds to distributed transmission, basically, the PDSCH transmission scheme based on the transmission mode of Table 3 may be assumed. This is because that it is likely that channel status information may not exist or may be incorrect in case of distributed transmission.

However, the transmission scheme of the PDSCH corresponding to the DCI format 1A may be determined as single antenna port transmission as described in the localized transmission. In this case, channel status reporting of the user equipment may be insufficient for localized EPDCCH transmission but may be not bad for DMRS based PDSCH transmission. This is because that the channel status information reported by the user equipment is obtained based on a PDSCH block error rate (BLER) of 10% and a control channel is based on a BLER of 1%. Accordingly, considering this case, a predetermined indicator (for example, second PDSCH transmission scheme indicator, which may be transmitted by higher layer signaling, such as RRC, DCI format, etc.) may indicate whether to use the aforementioned single antenna port as the PDSCH transmission scheme or use the transmissions scheme (that is, transmission scheme determined in accordance with a transmission mode) determined in accordance with Table 3. In this case, the second PDSCH transmission scheme indicator may be separate from or the same as the first PDSCH transmission scheme indicator.

Figure 11:
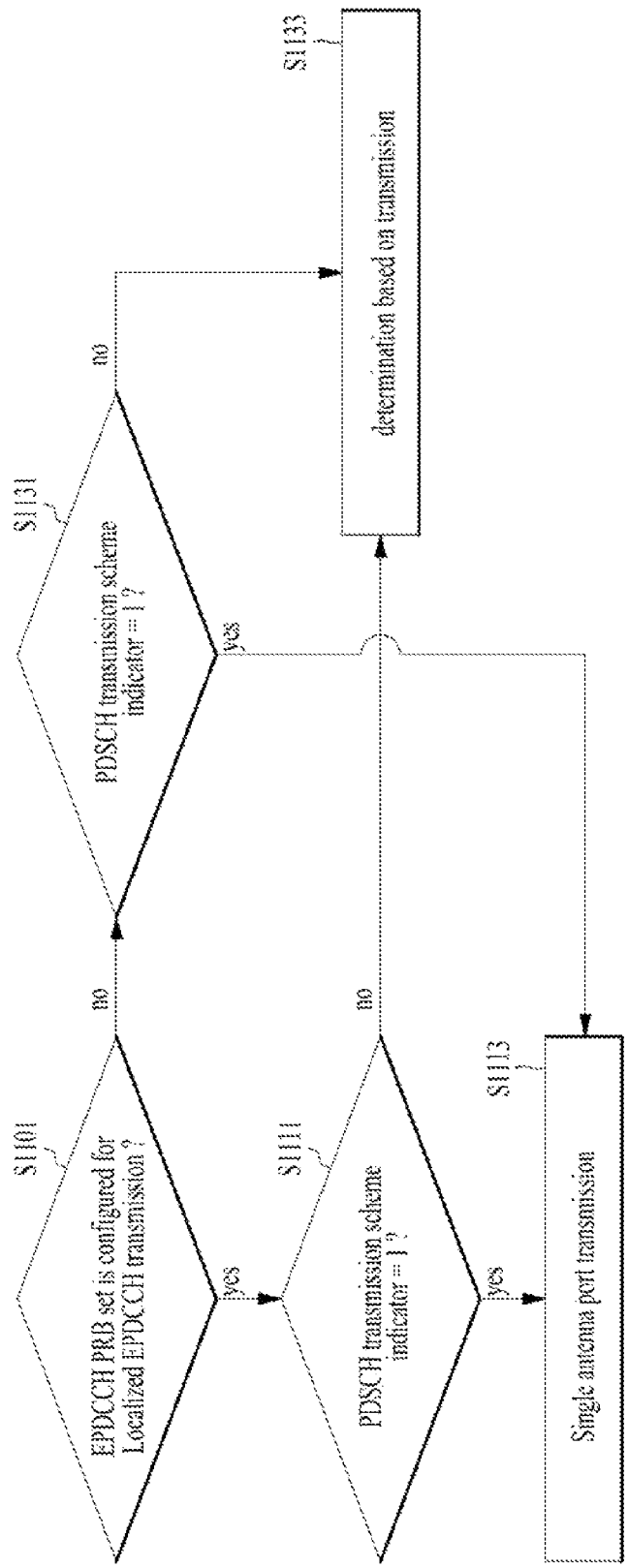

FIG. 11 illustrates a method for determining a PDSCH transmission scheme based on the aforementioned description. Referring to FIG. 11, it is determined whether an EPDCCH PRB set corresponds to localized EPDCCH transmission (S1101). If the EPDCCH PRB set corresponds to localized EPDCCH transmission, it is identified whether a PDSCH transmission scheme indicator is 1 (S1111). If the PDSCH transmission scheme indicator is 1, a PDSCH transmission scheme corresponding to a fallback mode DCI format may be determined as single antenna port transmission (S1113). In this case, the single antenna port may be any one of a port 7 which is a DMRS port, a port to which the EPDCCH is transmitted, or an antenna port designated by RRC signaling, as described above. If the PDSCH transmission scheme indicator is 0, the PDSCH transmission scheme may be determined by Table 3 (S1133).

Subsequently, if the EPDCCH PRB set does not correspond to localized EPDCCH transmission at step S1101, that is, if the EPDCCH PRB set is transmitted in accordance with a distributed EPDCCH transmission scheme, it is identified whether the PDSCH transmission scheme indicator is 1 (S1131). If the PDSCH transmission scheme indicator is 1, the PDSCH transmission scheme corresponding to the fallback mode DCI format may be determined as the single antenna port transmission (S1113). If the PDSCH transmission scheme indicator is not 1, the PDSCH transmission scheme corresponding to the fallback mode DCI format may be determined by Table 3 in the same manner as PDCCH transmission (S1133).

An example that a transmission mode 9 is configured for the user equipment will be described as follows. The PDSCH transmission scheme may be determined by further considering whether a corresponding subframe is MBSFN subframe or non-MBSFN subframe.

If the EPDCCH transmission scheme corresponds to localized transmission, the PDSCH may be transmitted through a DMRS based single port regardless of the fact that the corresponding subframe is MBSFN subframe. In this case, as described above, the single antenna port may be any one of a port 7 which is a DMRS port, a port to which the EPDCCH is transmitted, or an antenna port designated by RRC signaling.

If the EPDCCH transmission scheme corresponds to distributed transmission, the PDSCH transmission scheme may be determined differently depending on whether the corresponding subframe is MBSFN subframe. If the corresponding subframe is MBSFN subframe, the PDSCH may be transmitted through the DMRS based single port. In this case, the single antenna port may be any one of a port 7 which is a DMRS port, a port to which the EPDCCH is transmitted, or an antenna port designated by RRC signaling.

If the corresponding subframe is not MBSFN subframe, single port transmission or transmission diversity may be used depending on the number of PBCH antennas.

Determination of PDSCH Transmission Scheme Based on Scheduling Mode

If carrier aggregation is configured for the user equipment, that is, if the base station performs downlink transmission by using Pcell and Scell, the PDSCH transmission scheme indicated by the DCI format 1A may be identified depending on a scheduling mode (cross-carrier scheduling or self-scheduling) in carrier aggregation.

If cross-carrier scheduling is applied, that is, if PDSCH related information of Scell (scheduled cell) is indicated through the EPDCCH of Pcell (scheduling cell), the PDSCH transmission scheme may be determined in accordance with Table 3.

In case of self-scheduling, that is, if the Pcell and the Scell respectively transmit the EPDCCH and the PDSCH corresponding to the EPDCCH is located in an EPDCCH transmission cell, the PDSCH transmission scheme may be determined in accordance with the aforementioned 'determination of PDSCH transmission scheme based on the EPDCCH transmission scheme'.

Configuration of Apparatus According to the Embodiment of the Present Invention

Figure 12:
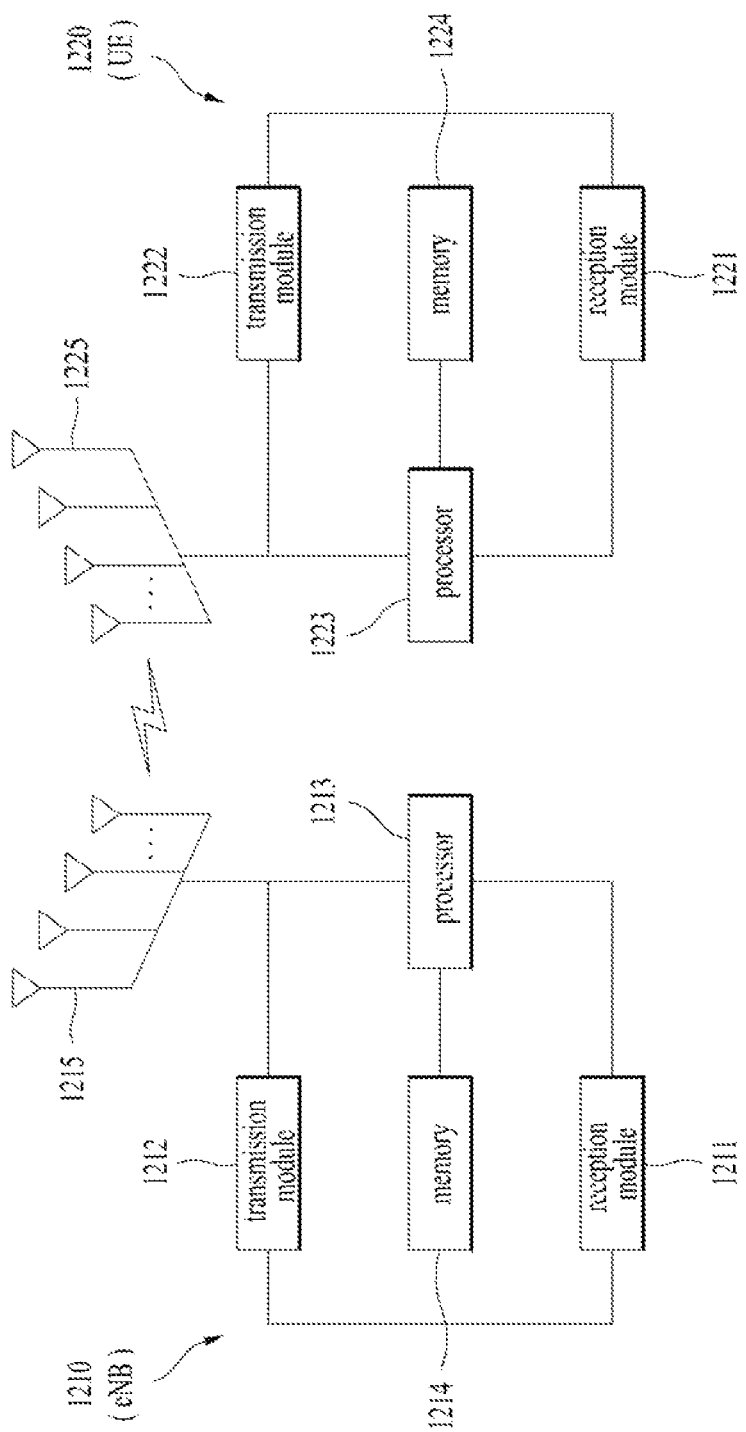
FIG. 12 is a diagram illustrating a configuration of a transceiving apparatus.

FIG. 12 is a diagram illustrating a configuration of a transmission point apparatus and a user equipment according to the embodiment of the present invention.

Referring to FIG. 12, the transmission point apparatus 1210 according to the present invention may include a reception module 1211, a transmission module 1212, a processor 1213, a memory 1214, and a plurality of antennas 1215. The plurality of antennas 1215 mean the transmission point apparatus that supports MIMO transmission and reception. The reception module 1211 may receive various signals, data and information on an uplink from the user equipment. The transmission module 1212 may transmit various signals, data and information on a downlink to the user equipment. The processor 1213 may control the overall operation of the transmission point apparatus 1210.

The processor 1213 of the transmission point apparatus 1210 according to the embodiment of the present invention may process requirements in each of the aforementioned embodiments.

In addition, the processor 1213 of the transmission point apparatus 1210 may process a function of operation-processing information received by the transmission point apparatus 1210, information which will be transmitted to the outside, etc., and the memory 1214 may store the operation-processed information for a predetermined time and may be replaced with an element such as a buffer (not shown).

Subsequently, referring to FIG. 12, the user equipment 1220 according to the present invention may include a reception module 1221, a transmission module 1222, a processor 1223, a memory 1224, and a plurality of antennas 1225. The plurality of antennas 1225 mean the user equipment that supports MIMO transmission and reception. The reception module 1221 may receive various signals, data and information on the downlink from the base station. The transmission module 1222 may transmit various signals, data and information on the uplink to the base station. The processor 1223 may control the overall operation of the user equipment 1220.

The processor 1223 of the user equipment 1220 according to the embodiment of the present invention may process requirements in each of the aforementioned embodiments.

In addition, the processor 1223 of the user equipment 1220 may process a function of operation-processing information received by the user equipment 1220, information which will be transmitted to the outside, etc., and the memory 1224 may store the operation-processed information for a predetermined time and may be replaced with an element such as a buffer (not shown).

The details of the aforementioned transmission point apparatus and the aforementioned user equipment may be configured in such a manner that the aforementioned various embodiments of the present invention may independently be applied thereto, or two or more embodiments may simultaneously be applied thereto. The repeated description of the details of the aforementioned transmission point apparatus and the aforementioned user equipment will be omitted for clarification.

Also, in the description of FIG. 12, the description of the transmission point apparatus 1210 may equally be applied to a relay station as a downlink transmission entity or uplink reception entity, and the description of the user equipment 1220 may equally be applied to a relay station as a downlink reception entity or uplink transmission entity.

The embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied various mobile communication systems.

The invention claimed is:

1. A method for enabling a user equipment to receive a downlink signal through an enhanced physical downlink control channel (EPDCCH) in a wireless communication system, the method comprising:
   decoding a fallback downlink control information (DCI) format in an EPDCCH physical resource block set;
   determining whether the EPDCCH physical resource block set is set to localized EPDCCH transmission or distributed EPDCCH transmission,
   wherein a physical downlink shared channel (PDSCH) transmission scheme for receiving a PDSCH is determined as a single antenna port, when the EPDCCH physical resource block set is determined as the localized EPDCCH transmission, and when a first PDSCH transmission scheme indicator is set to a first value, and
   wherein the PDSCH transmission scheme is determined based on any of a plurality of transmission modes, when the EPDCCH physical resource block set is determined as the distributed EPDCCH transmission, and when a second PDSCH transmission scheme indicator is set to a second value, and
   receiving the PDSCH on a basis of the fallback DCI format and the determined PDSCH transmission scheme.

2. The method according to claim 1, wherein the single antenna port is an antenna port used for EPDCCH transmission related to the fallback DCI format.

3. The method according to claim 1, wherein the single antenna port is a representative one of a plurality of antenna ports allocated to an enhanced control channel element (ECCE) related to the fallback DCI format.

4. The method according to claim 1, wherein the single antenna port is related to a demodulation reference signal.

5. The method according to claim 4, wherein the single antenna port is antenna port 7.

6. The method according to claim 1, wherein the EPDCCH and the PDSCH are transmitted on a same carrier.

7. The method according to claim 1, wherein the first PDSCH transmission scheme indicator is separate from or the same as the second PDSCH transmission scheme indicator.

8. A user equipment in a wireless communication system, the user equipment comprising:
a reception module; and
a processor,
wherein the processor is configured to:
decode a fallback downlink control information (DCI) format in an EPDCCH physical resource block set,
determine whether the EPDCCH physical resource block set is set to localized EPDCCH transmission or distributed EPDCCH transmission,
wherein a physical downlink shared channel (PDSCH) transmission scheme for receiving a PDSCH is determined as a single antenna port, when the EPDCCH physical resource block set is determined as the localized EPDCCH transmission, and when a first PDSCH transmission scheme indicator is set to a first value, and
wherein the PDSCH transmission scheme is determined based on any of a plurality of transmission modes, when the EPDCCH physical resource block set is determined as the distributed EPDCCH transmission, and when a second PDSCH transmission scheme indicator is set to a second value, and
control the reception module to receive the PDSCH on a basis of the fallback DCI format and the determined PDSCH transmission scheme.

* * * * *